(12) United States Patent
Norinobu

(10) Patent No.: US 7,975,152 B2
(45) Date of Patent: Jul. 5, 2011

(54) APPARATUS FOR CONTROLLING A SUPPLY OF POWER TO A SECOND APPARATUS INCLUDING AN INSTANT TELEVISION FUNCTION THAT OPERATES INDEPENDENTLY OF A FIRST APPARATUS

(75) Inventor: Takahide Norinobu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 744 days.

(21) Appl. No.: 11/826,004

(22) Filed: Jul. 11, 2007

(65) Prior Publication Data
US 2008/0016378 A1 Jan. 17, 2008

Related U.S. Application Data

(63) Continuation of application No. PCT/JP2005/002035, filed on Feb. 10, 2005.

(51) Int. Cl.
G06F 1/00 (2006.01)
H04N 7/16 (2011.01)
(52) U.S. Cl. ............................ 713/300; 713/324; 725/29
(58) Field of Classification Search .................. 713/300
See application file for complete search history.

(56) References Cited

U.S. PATENT DOCUMENTS

| 3,936,752 | A | * | 2/1976 | Sasabe et al. | ............... | 455/181.1 |
| 4,348,696 | A | * | 9/1982 | Beier | ............................... | 725/29 |
| 5,191,231 | A | * | 3/1993 | Berry | ............................ | 307/142 |
| 5,283,905 | A | * | 2/1994 | Saadeh et al. | ................. | 713/324 |
| 5,815,652 | A | * | 9/1998 | Ote et al. | ........................ | 714/31 |
| 5,995,454 | A |  | 11/1999 | Yamaki | | |
| 6,003,131 | A |  | 12/1999 | Lee et al. | | |
| 6,898,763 | B2 | * | 5/2005 | Hagiwara et al. | ............. | 715/716 |
| 7,116,376 | B2 | * | 10/2006 | Yun | ................. | 348/552 |
| 7,137,023 | B2 | * | 11/2006 | Lin et al. | ........................ | 713/500 |
| 7,317,495 | B2 | * | 1/2008 | Takahashi | ..................... | 348/838 |
| 2004/0004732 | A1 |  | 1/2004 | Takeda et al. | | |
| 2004/0064603 | A1 |  | 4/2004 | Sasaki | | |
| 2004/0225901 | A1 |  | 11/2004 | Bear et al. | | |

FOREIGN PATENT DOCUMENTS

| CN | 1480820 | | 3/2004 |
| JP | 10-49246 | | 2/1998 |
| JP | 10-083287 | | 3/1998 |
| JP | 11053066 A | * | 2/1999 |
| JP | 2001-341380 | | 12/2001 |

(Continued)

OTHER PUBLICATIONS

Office Action mailed Jun. 1, 2010 issued with respect to the Japanese Patent Application No. 2007-502521.

(Continued)

*Primary Examiner* — Suresh K Suryawanshi
(74) *Attorney, Agent, or Firm* — Staas & Halsey LLP

(57) ABSTRACT

A control apparatus controls a supply of power to a second apparatus that operates independently of a first apparatus, and includes a notifying part to make a notification that notifies a need to control the power supplied to the second apparatus if needed, based on a preset timer time and a present time acquired from a Real Time Clock (RTC) within the first apparatus, and a supplying part to supply information related to a time for controlling the power supplied to the second apparatus, based on the notification from the notifying part, wherein the notifying part and the supplying part are operable with a power that makes only limited functions within the first apparatus operable.

13 Claims, 3 Drawing Sheets

FOREIGN PATENT DOCUMENTS

| | | |
|---|---|---|
| JP | 2003-037799 | 2/2003 |
| JP | 2003-067073 | 3/2003 |
| JP | 2003-316480 | 11/2003 |
| JP | 2004-126749 | 4/2004 |
| JP | 2004-334877 | 11/2004 |

OTHER PUBLICATIONS

International Search Report mailed on May 17, 2005 in International Application PCT/JP2005/002035.
Chinese Office Action issued Mar. 3, 2011 in corresponding Patent Application No. 200580047223.2.

* cited by examiner

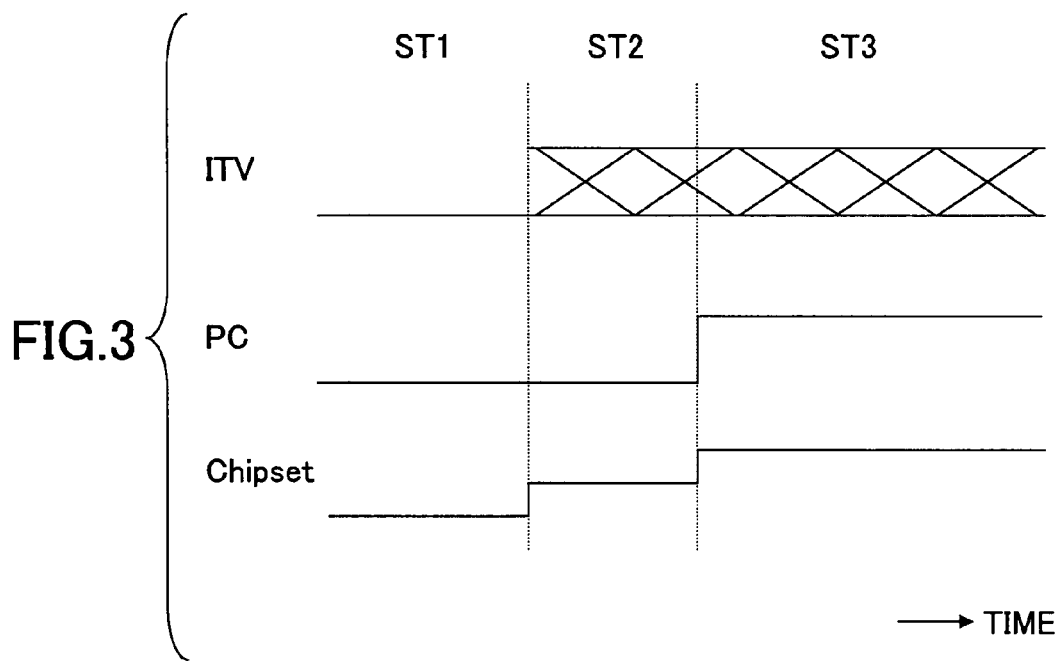

APPARATUS FOR CONTROLLING A SUPPLY OF POWER TO A SECOND APPARATUS INCLUDING AN INSTANT TELEVISION FUNCTION THAT OPERATES INDEPENDENTLY OF A FIRST APPARATUS

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2005/002035 filed Feb. 10, 2005, in the Japanese Patent Office, the disclosure of which is hereby incorporated by reference.

BACKGROUND OF THE INVENTION

1. Field of the Invention

The present invention generally relates to control apparatuses, information processing apparatuses and computer-readable storage media, and more particularly to a power control apparatus that uses a Real Time Clock (RTC), an information processing apparatus that realizes a timer function using the RTC, and a computer-readable storage medium that stores a program for causing a computer to realize such a timer function.

2. Description of the Related Art

Recently, some information processing apparatuses such as Personal Computers (PCs) have the so-called Instant Television (ITV) function that is realized by hardware. Such an information processing apparatus has a tuner unit that receives and selects a broadcast signal, and a television (TV) tuner that converts the broadcast signal selected by the tuner unit into a TV video signal. The TV video signal and a video signal of the information processing apparatus obtained by recording and reproducing the TV video signal are switched and output to a monitor. In the general information processing apparatus having a built-in TV tuner, the TV tuner is started after the information processing apparatus is started, and for this reason, it takes time for the TV video signal to be output from the time when the information processing apparatus is started. A TV tuner that can quickly output the TV video signal to the monitor even when the information processing apparatus is not started, has been proposed in a Japanese Laid-Open Patent Application No. 2003-67073, for example. This proposed TV tuner quickly outputs the TV video signal by switching a switch between a case where the TV video signal is output directly to the monitor and a case where the TV video signal is recorded or reproduced and output via the PC.

By using the ITV function, it is possible to receive the television broadcast by the information processing apparatus, and to display the received program in the entire region or in a portion of the entire region of a display part of the information processing apparatus. The information processing apparatus is provided with one or more speakers in most cases, and the audio of the received program can also be reproduced by the information processing apparatus.

On the other hand, some television apparatuses are provided with a timer function. The timer function is useful in that it is possible to set the time when the power of the television apparatus is to be turned ON or OFF. For this reason, there are demands to also provide the timer function in the information processing apparatus having the ITV function that is realized by hardware.

However, in the conventional information processing apparatus having the ITV function that is realized by hardware, no timer or clock is provided in the ITV function. Accordingly, in order to provide the timer function in the ITV function, it is necessary to separately provide a timer or clock exclusively for the ITV function, and increases in the hardware and the cost are inevitable.

In the case of the ITV function that is realized by software, it is possible to realize the timer function by software. In this case, when the power of the information processing apparatus is turned OFF, for example, it is not possible to run any software because the CPU does not operate. But in an environment where it is possible to run the software, it is possible to realize both the ITV function and the timer function. The timer function that is realized by software, however, does not operate when the CPU does not operate, such as when the power of the information processing apparatus is turned OFF, and for this reason, the timer function that is realized by software cannot be utilized for the ITV function that is realized by hardware.

The applicant is aware of the prior art proposed in Japanese Laid-Open Patent Applications No. 2003-37799 and No. 10-83287. The Japanese Laid-Open Patent Application No. 2003-37799 proposes an information processing apparatus having an ITV function that includes a remote controlled reserve function. The Japanese Laid-Open Patent Application No. 10-83287 proposes an information processing apparatus having a plurality of switches corresponding to added application functions, wherein a routine for realizing an added application function is loaded without loading an Operating System (OS) routine when at least one of the switches is ON.

SUMMARY OF THE INVENTION

Accordingly, it is a general object of the present invention to provide a novel and useful control apparatus, information processing apparatus and computer-readable storage medium, in which the problems described above are suppressed.

Another and more specific object of the present invention is to provide a control apparatus, an information processing apparatus and a computer-readable storage medium, which can provide a timer function in an ITV function that is realized by hardware, without having to separately provide a timer or clock exclusively for the ITV function and without increasing the hardware and the cost.

Still another object of the present invention is to provide a control apparatus for controlling a supply of power to a second apparatus that operates independently of a first apparatus, comprising a notifying part configured to make a notification that notifies a need to control the power supplied to the second apparatus if needed, based on a preset timer time and a present time acquired from a Real Time Clock (RTC) within the first apparatus; and a supplying part configured to supply information related to a time for controlling the power supplied to the second apparatus, based on the notification from the notifying part, wherein the notifying part and the supplying part are operable with a power that makes only limited functions within the first apparatus operable. According to the control apparatus of the present invention, it is possible to provide a timer function in an ITV function that is realized by hardware, without having to separately provide a timer or clock exclusively for the ITV function and without increasing the hardware and the cost.

A further object of the present invention is to provide an information processing apparatus forming a first apparatus having a built-in Real Time Clock (RTC), comprising a notifying part configured to make a notification that notifies a need to control the power supplied to a second apparatus if needed, based on a preset timer time and a present time acquired from a Real Time Clock (RTC) within the first apparatus; and a supplying part configured to supply information related to a time for controlling the power supplied to the second apparatus, based on the notification from the notifying part, wherein the notifying part and the supplying part are operable with a power that makes only limited functions within the first apparatus operable, and the first apparatus operates with a power supply different from that of the second apparatus. According to the information processing apparatus of the present invention, it is possible to provide a timer function in an ITV function that is realized by hardware, without having to separately provide a timer or clock exclusively for the ITV function and without increasing the hardware and the cost.

Another object of the present invention is to provide a computer-readable storage medium that stores a program for causing a computer to control a supply of power to an apparatus that operates independently of the computer, the program comprising a notifying procedure causing the computer to make a notification that notifies a need to control the power supplied to the apparatus if needed, based on a preset timer time and a present time acquired from a Real Time Clock (RTC) within the computer, regardless of a power state of the apparatus; and a supplying procedure causing the computer to supply information related to a time for controlling the power supplied to the apparatus, based on the notification made by the notifying procedure, regardless of the power state of the apparatus. According to the computer-readable storage medium of the present invention, it is possible to provide a timer function in an ITV function that is realized by hardware, without having to separately provide a timer or clock exclusively for the ITV function and without increasing the hardware and the cost.

Other objects and further features of the present invention will be apparent from the following detailed description when read in conjunction with the accompanying drawings.

BRIEF DESCRIPTION OF THE DRAWINGS

FIG. 3 is a time chart showing power states at important parts of the information processing apparatus.

DESCRIPTION OF THE PREFERRED EMBODIMENTS

Figure 1:
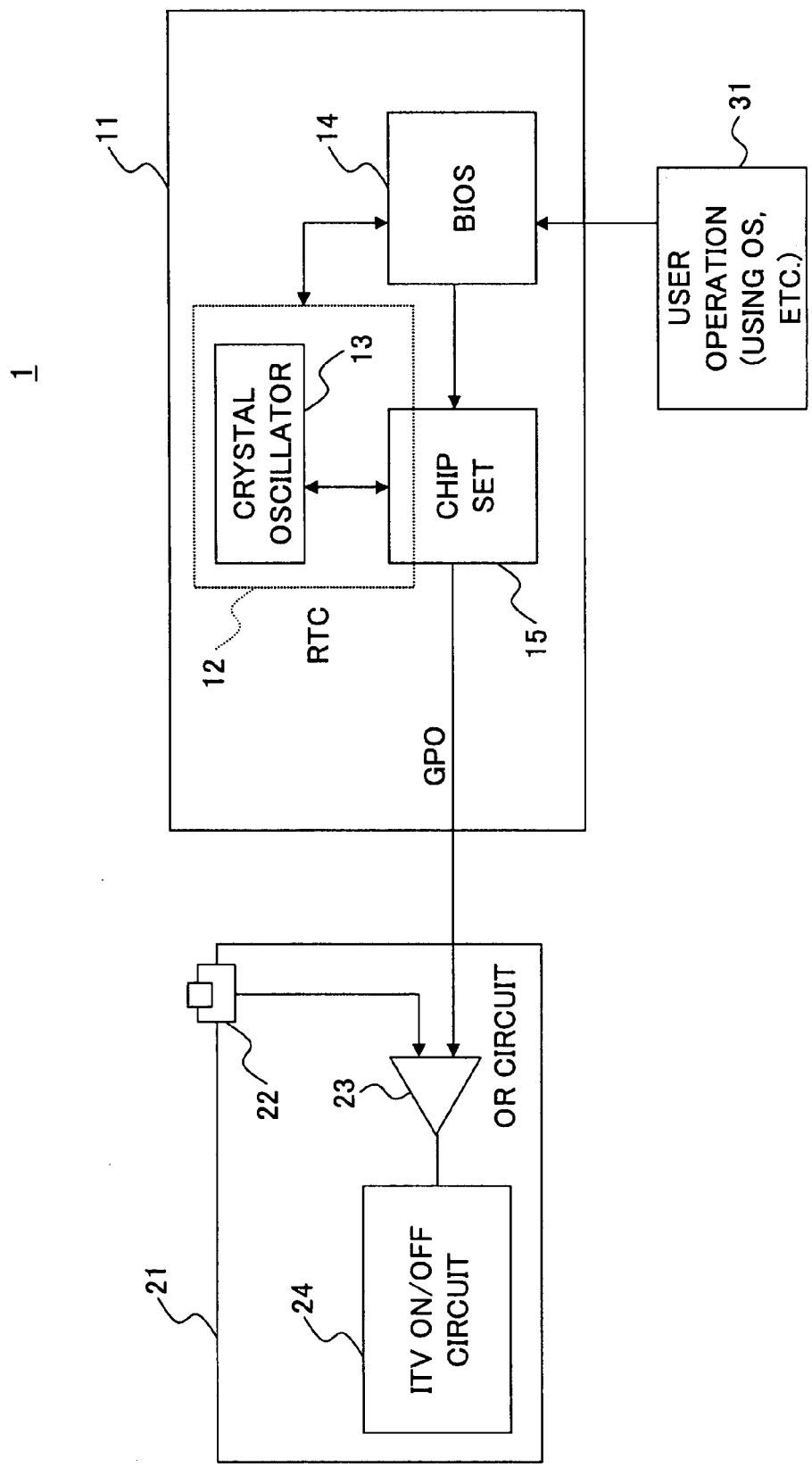
FIG. 1 is a system block diagram showing an important part of an embodiment of an information processing apparatus according to the present invention.

A description will be given of embodiments of a control apparatus, an information processing apparatus and a computer-readable storage medium according to the present invention, by referring to the drawings.

Information processing apparatuses, such as personal computers (PCs), are provided with a Real Time Clock (RTC). Accordingly, it is conceivable to utilize this RTC in the ITV function that is realized by hardware. However, in order to supply the time information from the RTC directly to the ITV function, it is necessary to provide in the information apparatus an interface exclusively (or dedicated) for this purpose. In this case, it is not possible to use the existing hardware structure of the information processing apparatus, and it becomes necessary to modify the design of the hardware structure of the information processing apparatus. For this reason, although it is unnecessary to separately provide a timer or clock exclusively for the ITV function, it is difficult to provide the timer function in the ITV function without increasing the hardware and the cost, because of the need to modify the design of the hardware structure of the information processing apparatus. In addition, if the ITV function that is realized by hardware uses a power supply different from the power supply used by other parts of the information processing apparatus, the ITV function cannot receive the time information directly from the RTC unless not only the power of the information processing apparatus but also the power of the ITV function are ON.

The present invention makes the RTC usable by the ITV function that is realized by hardware, without requiring the hardware structure of the information processing apparatus to be modified. More particularly, as will be described later, the ITV function is made to have the timer function regardless of the power state of the ITV function, by an ON/OFF timer that uses a signal generatable with a standby power of the information processing apparatus, such as a General Purpose Output (GPO) of a General Purpose Input/Output (GPI/O) that is originally provided in the information processing apparatus. The GPI/O is originally used to transfer data depending on whether each bit has a high level or a low level, and is suited for use in the ON/OFF timer since there are no timing restrictions associated therewith.

FIG. 1 is a system block diagram showing an important part of an embodiment of the information processing apparatus according to the present invention. This embodiment of the information processing apparatus employs an embodiment of the control apparatus according to the present invention and an embodiment of the computer-readable storage medium according to the present invention. In this embodiment, it is assumed for the sake of convenience that the present invention is applied to the Personal Computer (PC). The PC may be a portable type such as a laptop PC or, a set-up type such as a desktop PC.

A PC 1 shown in FIG. 1 has a known basic structure including a processor such as a CPU, a storage part such as a memory, an input part such as a remote control, a keyboard and a mouse, and a display part. The illustration and description of this basic structure of the PC 1 will be omitted. FIG. 1 only shows parts of the PC 1 that are directly related to the subject matter of the present invention. The PC 1 has a first part (or PC part or apparatus) 11 and a second part (or ITV part or apparatus) 21. The first part 11 includes an RTC 12 having a known structure that includes a crystal oscillator 13, a known Basic Input Output System (BIOS) 14, and a chip set 15. The RTC 12, the BIOS 14 and the chip set 15 form an ON and/or OFF (ON/OFF) timer of this embodiment. At least a portion of the BIOS 14 and at least a portion of the chip set 15 form a program of this embodiment that causes a computer to realize a timer function. This program may be stored in the computer-readable storage medium.

The BIOS 14 and the chip set 15 are realized by the processor and the storage part. The chip set 15 is the software that controls the entire hardware and the entire software of the PC 1. In this embodiment, the chip set 15 also realizes a portion of the function of the RTC 12. The RTC 12 is operable even with the standby power, such as when the power of the PC 1 is OFF. At least a portion of the functions of the BIOS 14 and the chip set 15 are operable with the standby power. Information 31 that is input by a user from the input part using a software on a known Operating System (OS) is supplied to the BIOS 14 of the first part 11. Of course, the user may supply the information 31 to the BIOS 14 by directly operating the BIOS 14 from the input part. Accordingly, this embodiment can set time events of the ITV function, that is, the ON time and/or OFF time of the ON/OFF timer, using the interface of the PC 1.

On the other hand, the second part 21 forms the ITV function that is realized by hardware. The second part 21 includes a power switch 22 that turns the power of the ITV function ON and OFF, an OR circuit 23, and an ITV ON/OFF circuit 24. The power switch 22 may be formed by a mechanical switch or button or, a button that is displayed on the display part and operated on the display part. In this embodiment, the power supply used by the second part 21 is different from the power supply used by the first part 11, and the second part 21 operates independently of the first part 11. It is not essential for the second part 21 to be provided within the PC 1, and the second part 21 may be connected externally to the PC 1 as long as the second part 21 is connected to the first part 11. For example, in the case where the PC 1 is a desktop PC, the second part 21 may be provided within a monitor part where the display part of the PC 1 is provided.

Figure 2:
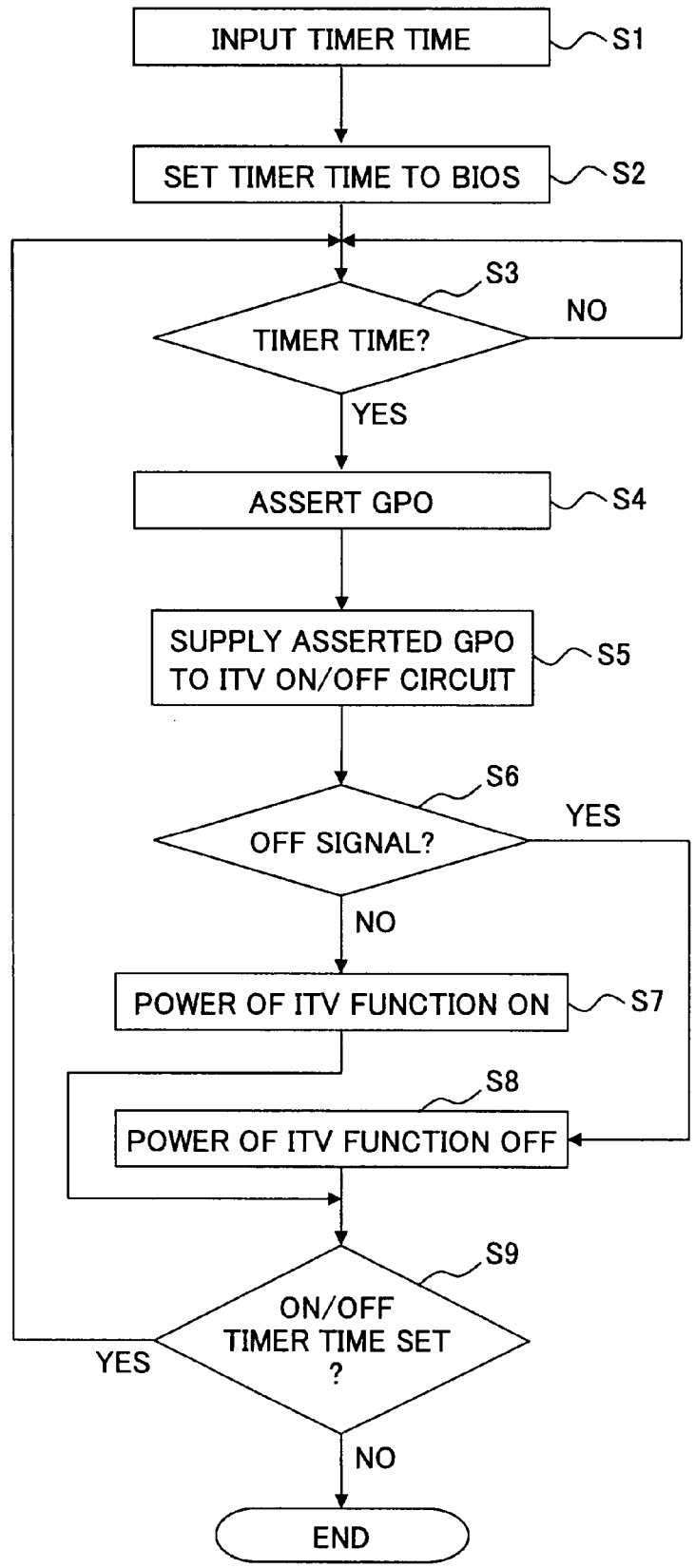
FIG. 2 is a flow chart for explaining an operation of the information processing apparatus.

FIG. 2 is a flow chart for explaining the operation of the information processing apparatus shown in FIG. 1, that is, the operation of the PC 1. In FIG. 2, a step S1 inputs the information 31 for setting the ON time and/or OFF time of the ON/OFF timer of the ITV function to the PC 1 based on the operation made by the user from the input part. A step S2 sets the ON time and/or OFF time of the ON/OFF timer of the ITV function in the BIOS 15 based on the information 31. A step S3 decides by the BIOS 14 whether or not the present time obtained from the RTC 12 has reached the set ON time or the set OFF time of the ON/OFF timer of the ITV function. The process advances to a step S4 if the decision result in the step S3 is YES. In other words, the step S3 decides whether or not the power of the ITV function needs to be turned ON and/or OFF, and notifies the chip set 15 if the power of the ITV function needs to be turned ON and/or OFF.

The step S4 asserts by the chip set 15 a signal of the General Purpose Output (GPO) of the General Purpose Input/Output (GPI/O). In other words, when notified from the BIOS 14 that the power of the ITV function needs to be turned ON and/or OFF, the step S4 asserts the signal for turning the power of the ITV function ON and/or OFF. The signal of the GPO used in this embodiment has 2 bits, and indicates information related to the ON time of the ON/OFF timer or, information related to the OFF time of the ON/OFF timer. A step S5 supplies the asserted signal of the GPO to the ITV ON/OFF circuit 24 within the second part 21 via the OR circuit 23. A signal from the power switch 22 that turns the power of the ITV function ON and OFF, is also supplied to the OR circuit 23. If the asserted signal of the GPO indicates the information related to the ON time of the ON/OFF timer, the OR circuit 23 supplies to the ITV ON/OFF circuit 24 an ON signal that turns ON the power of the ITV function regardless of the ON or OFF state of the power switch 22. In addition, if the asserted signal of the GPO indicates the information related to the OFF time of the ON/OFF timer, the OR circuit 23 supplies to the ITV ON/OFF circuit 24 an OFF signal that turns OFF the power of the ITV function regardless of the ON or OFF state of the power switch 22. If the signal of the GPO supplied to the OR circuit 23 is not asserted, the OR circuit 23 supplies to the ITV ON/OFF circuit 24 the ON signal that turns ON the power of the ITV function or, the OFF signal that turns OFF the power of the ITV function, depending on the ON and OFF states of the power switch 22. Therefore, this embodiment can send the time events of the ITV function, that is, the ON time and/or OFF time of the ON/OFF timer, using the signal of the GPO.

A step S6 decides whether or not the signal received by the ITV ON/OFF circuit 24 from the OR circuit 23 is the OFF signal. If the ITV ON/OFF circuit 24 receives the ON signal from the OR circuit 23 and the decision result in the step S6 is NO, a step S7 switches the power of the ITV function ON if OFF, by the ITV ON/OFF circuit 24, and the process advances to a step S9. On the other hand, if the decision result in the step S6 is YES, a step S8 switches the power of the ITV function OFF if ON, by the ITV ON/OFF circuit 24, and the process advances to the step S9. The step S9 decides by the BIOS 14 whether or not a time required by the ITV ON/OFF circuit 24 to turn the power of the ITV function ON or OFF has elapsed and the ON time or the OFF time of the ON/OFF timer is set to a time after the present time. The process ends if the decision result in the step S9 is NO, and the process returns to the step S3 if the decision result in the step S9 is YES.

FIG. 3 is a time chart showing power states at important parts of the information processing apparatus, that is, the PC 1. In FIG. 3, ITV indicates the power state of the second part 21, that is, the ITV function, PC indicates the power state of the PC 1, and Chipset indicates the power state of the chip set 15 within the first part 11.

In FIG. 3, it is assumed for the sake of convenience that the PC 1 is a desktop PC, and that in a state ST1, the power of the ITV function is OFF, the power of the PC 1 is OFF, and the power of the chip set 15 is OFF. For example, the PC 1 is not connected to an AC power supply in the state ST1, and only very limited functions, such as the RTC 12, are operable using a battery within the PC 1 as the power supply.

For example, the PC 1 is connected to the AC power supply in a state ST2. In the state ST2, the power of the ITV function is ON, the power of the PC 1 is OFF, and the standby power is usable by the BIOS 14 and the chip set 15 within the PC 1. In the state ST2, limited functions within the PC 1, such as a portion of the BIOS 14 for executing the step S3 shown in FIG. 2 and a portion of the chip set 15 for executing the step S4 shown in FIG. 2, are operable in addition to the RTC 12. In other words, in the state ST2, it is possible for the BIOS 14 to acquire the present time from the RTC 12, and it is possible for the chip set 15 to generate the signal of the GPO used in this embodiment. For this reason, if the ON time of the ON/OFF timer is set and the present time reaches this ON time, the power of the ITV function can be switched to the ON state as shown in FIG. 3 even when the power of the PC 1 is in the OFF state.

For example, the PC 1 is connected to the AC power supply, the power of the ITV function is ON, and the power of the PC 1 is ON in a state ST3. In other words, in the state ST3, the power of the PC 1 is ON and all of the functions including the processor within the PC 1 are usable.

In the case where the PC 1 is a desktop PC, the power of the PC 1 is OFF in the state ST1, the power of the PC 1 is ON but the operation mode of the PC 1 is set to a power save mode in the state ST2, and the power of the PC 1 is ON and the operation mode of the PC 1 is set to the normal mode in the state ST3.

The program for causing the computer to carry out the operation described above may be stored in any type of computer-readable storage medium, including the storage part of the PC 1. The computer-readable storage medium may be formed by a semiconductor memory device, a magnetic recording medium, an optical recording medium, a magneto-optical recording medium or the like.

Therefore, the present invention is applicable to information processing apparatuses, such as personal computers, provided with the ITV function that is realized by hardware or, connectable to the ITV function that is realized by hardware.

Further, the present invention is not limited to these embodiments, but various variations and modifications may be made without departing from the scope of the present invention.

What is claimed is:

1. A control apparatus for controlling a supply of power to a second apparatus that operates independently of a first apparatus, comprising:
   a notifying part configured to make a notification that notifies a need to control the power supplied to the second apparatus from a second power supply that is different from a first power supply that supplies power to the first apparatus, based on a preset timer time and a present time acquired from a Real Time Clock (RTC) within the first apparatus, said second apparatus including an Instant Television (ITV) function and a power switch having ON and OFF states to supply and cutoff the power from the second power supply to the second apparatus; and
   a supplying part configured to supply a signal indicating at least one of an ON time and an OFF time of the ITV function to the second apparatus by asserting the signal, based on the notification from the notifying part,
   wherein said notifying part and said supplying part are operable with a power that makes only limited functions within the first apparatus operable,
   said supplying part turns the power of the second apparatus ON by the asserted signal indicating the ON time of the ITV function, regardless of whether the power switch is in the ON or OFF state, and
   said supplying part turns the power of the second apparatus OFF by the asserted signal indicating to the OFF time of the ITV function, regardless of whether the power switch is in the ON or OFF state.

2. The control apparatus as claimed in claim 1, wherein the asserted signal has no timing restrictions.

3. The control apparatus as claimed in claim 1, further comprising:
   a setting part configured to set the timer time to the first apparatus.

4. The control apparatus as claimed in claim 1, wherein:
   said notifying part is formed by at least a portion of a Basic Input Output System (BIOS) of the first apparatus; and
   said supplying part is formed by at least a portion of a chip set of the first apparatus, and uses a signal of a General Purpose Output (GPO) as the asserted signal.

5. An information processing apparatus forming a first apparatus having a built-in Real Time Clock (RTC), comprising:
   a notifying part configured to make a notification that notifies a need to control the power supplied to a second apparatus from a second power supply that is different from a first power supply that supplies power to the first apparatus, based on a preset timer time and a present time acquired from a Real Time Clock (RTC) within the first apparatus, said second apparatus including an Instant Television (ITV) function and a power switch having ON and OFF states to supply and cutoff the power from the second power supply to the second apparatus; and
   a supplying part configured to supply a signal indicating at least one of an ON time and an OFF time of the ITV function to the second apparatus by asserting the signal, based on the notification from the notifying part,
   wherein said notifying part and said supplying part are operable with a power that makes only limited functions within the first apparatus operable,
   said supplying part turns the power of the second apparatus ON by the asserted signal indicating the ON time of the ITV function, regardless of whether the power switch is in the ON or OFF state, and
   said supplying part turns the power of the second apparatus OFF by the asserted signal indicating to the OFF time of the ITV function, regardless of whether the power switch is in the ON or OFF state.

6. The information processing apparatus as claimed in claim 5, wherein the asserted signal has no timing restrictions.

7. The information processing apparatus as claimed in claim 5, further comprising:
   a setting part configured to set the timer time with respect to the notifying part.

8. The information processing apparatus as claimed in claim 5, wherein:
   said notifying part is formed by at least a portion of a Basic Input Output System (BIOS); and
   said supplying part is formed by at least a portion of a chip set, and uses a signal of a General Purpose Output (GPO) as the asserted signal.

9. An information processing apparatus forming a first apparatus having a built-in Real Time Clock (RTC), comprising:
   a notifying part configured to make a notification that notifies a need to control the power supplied to a second apparatus from a second power supply that is different from a first power supply that supplies power to the first apparatus, based on a preset timer time and a present time acquired from a Real Time Clock (RTC) within the first apparatus; and
   a supplying part configured to supply a signal indicating at least one of an ON time and an OFF time of an Instant Television (ITV) function to the second apparatus by asserting the signal, based on the notification from the notifying part,
   wherein said notifying part and said supplying part are operable with a power that makes only limited functions within the first apparatus operable;
   said second apparatus is included in the information processing apparatus;
   said second apparatus comprises a power switch having ON and OFF states to supply and cutoff the power from the second power supply to the second apparatus based on a signal output therefrom, an OR circuit supplied with the signal from said supplying part and the signal from the power switch, and an Instant Television (ITV) control circuit configured to provide the ITV function based on an output of the OR circuit,
   said supplying part turns the power of the second apparatus ON by the asserted signal indicating the ON time of the ITV function, regardless of whether the power switch is in the ON or OFF state, and
   said supplying part turns the power of the second apparatus OFF by the asserted signal indicating to the OFF time of the ITV function, regardless of whether the power switch is in the ON or OFF state.

10. A computer-readable storage medium that stores a program for causing a computer to control a supply of power to an apparatus that operates independently of the computer, said program comprising:
   a notifying procedure causing the computer to make a notification that notifies a need to control the power supplied to the apparatus from a second power supply that is different from a first power supply that supplies power to the computer, based on a preset timer time and a present time acquired from a Real Time Clock (RTC) within the computer, regardless of a power state of the apparatus, said apparatus including an Instant Television (ITV) function and a power switch having ON and OFF states to supply and cutoff the power from the second power supply to the apparatus; and a supplying procedure causing the computer to supply a signal indicating at least one of an ON time and an OFF time of the ITV function to the apparatus by asserting the signal, based on the notification made by the notifying procedure, regardless of the power state of the apparatus, said supplying procedure causes the computer to turn the power of the apparatus ON by the asserted signal indicating the ON time of the ITV function, regardless of whether the power switch is in the ON or OFF state, and said supplying procedure causes the computer to turn the power of the apparatus OFF by the asserted signal indicating to the OFF time of the ITV function, regardless of whether the power switch is in the ON or OFF state.

11. The computer-readable storage medium as claimed in claim 10, wherein the asserted signal has having no timing restrictions.

12. The computer-readable storage medium as claimed in claim 10, wherein said program further comprises:
   a setting procedure causing the computer to set the timer time to the apparatus.

13. The computer-readable storage medium as claimed in claim 10, wherein:
   said notifying procedure is realized by at least a portion of a Basic Input Output System (BIOS) of the computer; and
   said supplying procedure is realized by at least a portion of a chip set of the computer, and uses a signal of a General Purpose Output (GPO) as the asserted signal.

* * * * *